United States Patent [19]

Staub, Jr.

[11] 4,287,978

[45] Sep. 8, 1981

[54] ANNULAR FRICTION DISC WITH RADIAL GROOVING

[75] Inventor: Vincent M. Staub, Jr., Dayton, Ohio

[73] Assignee: General Motors Corporation, Detroit, Mich.

[21] Appl. No.: 60,798

[22] Filed: Jul. 25, 1979

[51] Int. Cl.³ ............................................. F16D 13/74
[52] U.S. Cl. ............................ 192/113 B; 192/107 R; 188/264 B
[58] Field of Search ........... 192/107 R, 107 M, 70.12, 192/70.14, 113 B, 113 A, 113 R; 188/71.1, 71.3, 264 B

[56] References Cited

U.S. PATENT DOCUMENTS

| | | | |
|---|---|---|---|
| 3,982,611 | 9/1976 | Gannon | 192/107 R |
| 4,113,067 | 9/1978 | Coons et al. | 192/113 B |
| 4,139,085 | 2/1979 | Kanbe et al. | 192/107 R |

*Primary Examiner*—George H. Krizmanich
*Attorney, Agent, or Firm*—Donald F. Scherer

[57] ABSTRACT

An annular friction disc has a flat friction surface on each side of a flat steel plate with each friction surface having a plurality of radially extending grooves formed therein. Each groove has a flat bottom portion which extends between the inner and outer circumference of the friction surface and is displaced axially from the friction surface at the inner circumference and is contiguous with the friction surface at the outer circumference. Each groove also has a pair of tapered side walls extending between the bottom portion and the adjacent flat friction surface.

1 Claim, 5 Drawing Figures

ANNULAR FRICTION DISC WITH RADIAL GROOVING

This invention relates to friction discs and more particularly to grooved friction discs.

It is an object of this invention to provide an improved grooved friction disc wherein oil flow channeled by the groove will assist in causing separation of the discs when used in a clutch or brake pack.

It is another object of this invention to provide an improved friction disc wherein the grooves are tapered from the inside diameter to the outside diameter of the disc and the side walls are slanted so that oil flow in the groove will create a separating force in a "free running" clutch or brake pack.

These and other objects and advantages of the present invention will be more apparent from the following description and drawings in which.

Figure 1:
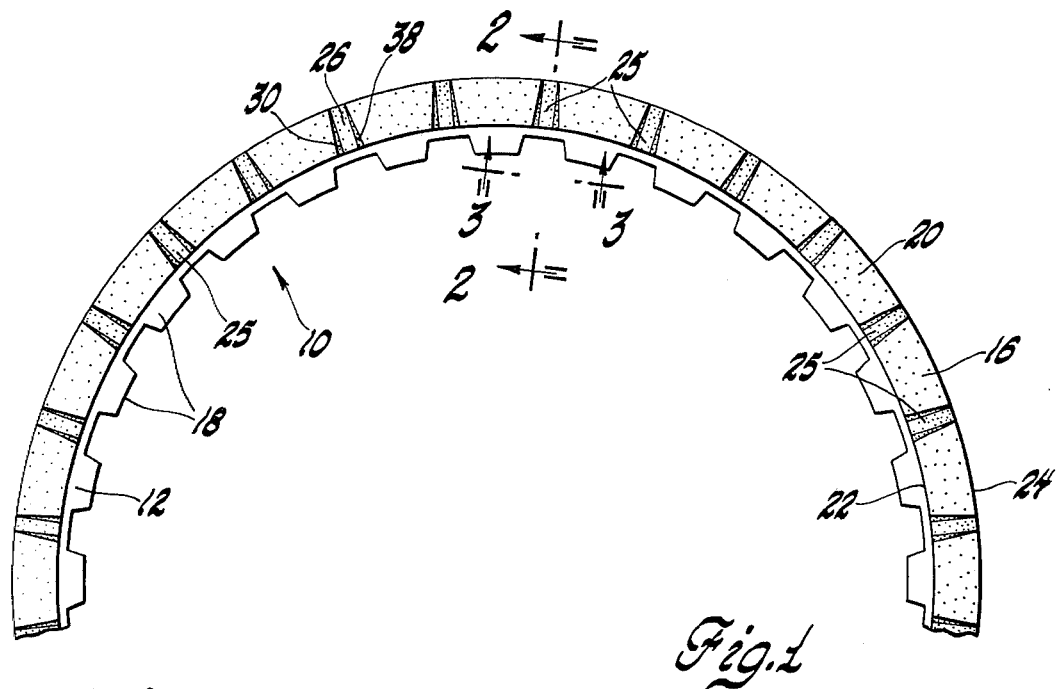
FIG. 1 is an elevational view of a friction disc.
Figures 2, 3, 4:
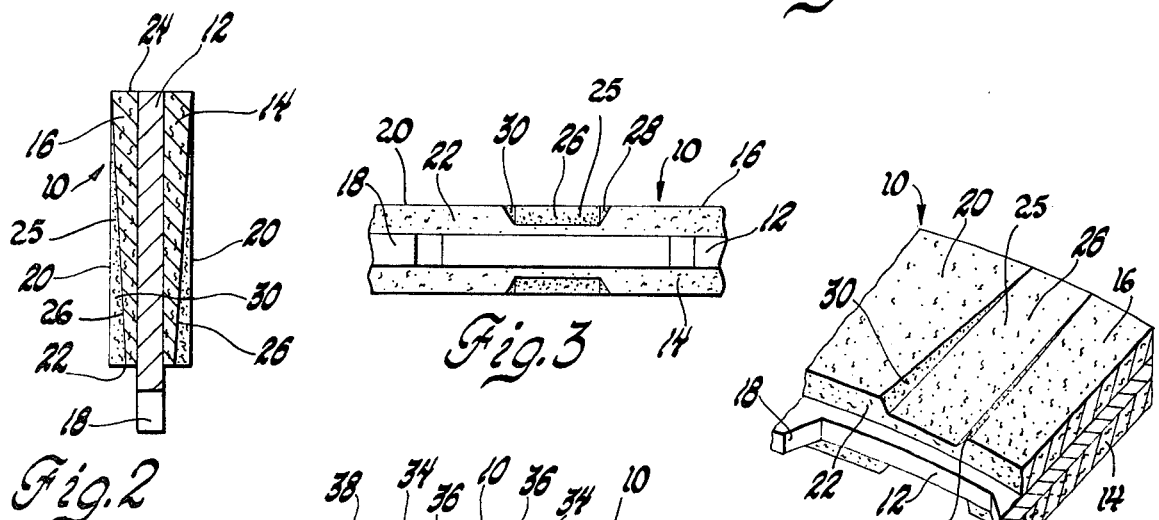
FIG. 2 is a view taken along line 2—2 of FIG. 1.
FIG. 3 is a view taken along line 3—3 of FIG. 1.
FIG. 4 is a perspective view of a portion of a portion of a friction disc.

Referring to the drawings, wherein like characters represent the same or corresponding parts throughout the several views, there is seen a friction disc, generally designated 10, having a flat steel annular plate or disc 12 bounded on each side by friction discs 14 and 16. The friction discs 14 and 16 are identical and are preferably made in accordance with the present acceptable manufacturing techniques wherein impregnated paper can be utilized as a friction disc. After the paper is treated, it is then bonded to the annular steel disc member 12, which has formed at the inner diameter a plurality of spline teeth 18 which are operable to provide a mechanical connection in a well-known manner.

Since the friction disc 14 and 16 are identical, the following discussion will be limited to the friction disc 16. However, the same numerical designations will be given to corresponding structures formed on friction disc 14. The friction disc 16 has a generally flat outer surface 20, an inner circumference 22 and an outer circumference 24. The flat surface 20 is interrupted by a plurality of radially extending grooves 25 each having a flat bottom 26 which extends from the inner circumference 22, at a distance displaced from the flat surface 20 to a line contiguous with the flat surface 20 at the outer circumference 24. Each groove 25 has side walls 28 and 30 which intersect the flat bottom 26 and extend upward and outward to intersect the flat surface of disc 20.

Figure 5:
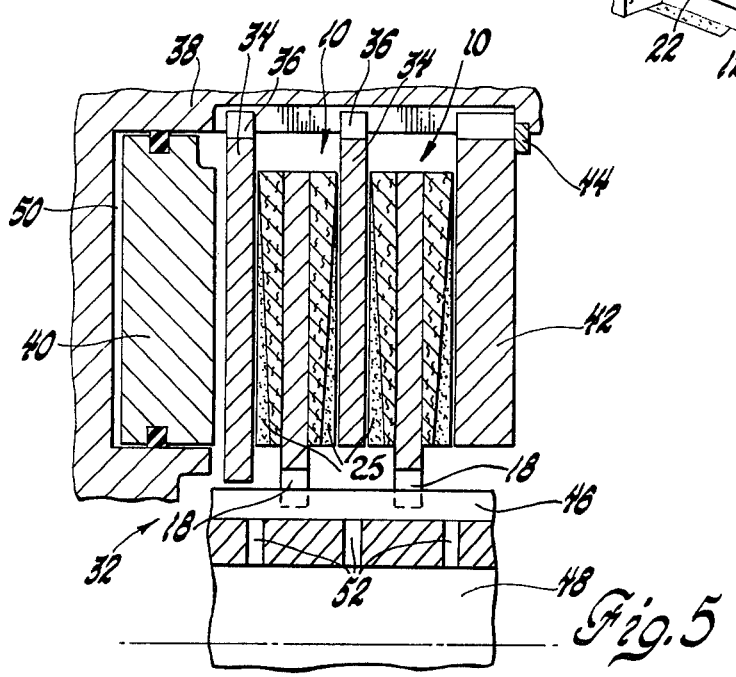
FIG. 5 is a cross-sectional side view of a clutch or brake pack.

A plurality of friction discs 10 are used in a clutch or brake pack to provide a friction drive establishing connection in power transmissions. These friction drive connections take the form of either a clutch which transmits torque between rotating components or a brake which provides a connection with a stationary housing. Such a structure is shown in FIG. 5 and is generally designated 32 and will be referred to as a brake, however, as is well-known, a clutch structure would be substantially identical. In the brake 32, the friction discs 10 are separated by steel plates or discs 34 which have a splined portion 36 at the outer diameter. The spline 36 is adapted to be fitted in a mating spline portion formed in a stationary housing 38 in which is slidably disposed a fluid actuated piston 40. The piston 40 forms one side of the brake 32 while the other side is defined by a back-up plate 42 which is splined on the housing 38 and maintained in position by an annular snap ring 44. The spline 18 of the friction discs 10 mate with a spline 46 formed on a hub 48. The hub 48 is adapted to be connected with a conventional gear member, such as a sun gear in a planetary gear system. When fluid pressure is admitted to the chamber 50, formed between piston 40 and housing 38, the piston 40 will be pressed into engagement with one of the plates 34 which will result in the alternate plates 34 and friction discs 10 being forced into a friction engaging relationship as is well-known. When the chamber 50 is thus pressurized, the hub 48 is held stationary and there is no relative motion between discs 10 and 34. However, when the chamber 50 is not pressurized, there will generally be relative rotation between friction discs 10 and plate 34.

There is a drag torque between discs 10 and 34 when the brake pack is in the "free running" condition. This drag torque is a parasitic loss, and should be eliminated to the extent possible. The grooves 25 reduce the drag torque considerably by creating a flow pattern between the discs 10 and 34 which assist in causing separation between the discs.

When the chamber 50 is unpressurized, lubricating fluid within the system flows through openings 52 formed in the hub 48 and accordingly toward the grooves 25. Once the fluid reaches the grooves 25, it flows both radially outward and also circumferentially across the slanted surfaces 30 and 28, depending upon the direction of rotation, to create a separating force between the discs 10 and 34. This effectively creates a fluid bearing between adjacent surfaces considerably reducing the drag friction normally present in such devices.

As previously mentioned, the grooved friction disc will operate equally well in either a clutch structure or a brake structure. However, it will be found most useful in brake structures, because, generally in power transmissions for use in motor vehicles, clutches are engaged for most operation while brakes are engaged during lower gear ratios used for acceleration or deceleration.

The embodiments of the invention in which an exclusive property or privilege is claimed are defined as follows:

1. A friction disc for a clutch or brake comprising; an annular disc of friction material having a radial inner periphery and a radial outer periphery, a substantially flat surface between the peripheries and a plurality of radially extending circumferentially spaced grooves formed in said flat surface and each groove having an edge at the inner periphery displaced axially from the flat surface, an edge at the outer periphery contiguous with the flat surface and spaced sidewalls disposed at an angle to the groove bottom and the flat surface.

* * * * *